United States Patent [19]

Ohara

[11] Patent Number: 5,189,517
[45] Date of Patent: Feb. 23, 1993

[54] REMOTE UNIT FOR CONTROLLING THE OPERATION OF A TELEVISION RECEIVER

[76] Inventor: John Ohara, 2716 Butler Ave., Los Angeles, Calif. 90064

[21] Appl. No.: 237,084

[22] Filed: Aug. 29, 1988

[51] Int. Cl.⁵ .............................................. H04N 5/44
[52] U.S. Cl. ............................. 358/194.1; 358/192.1; 455/151.1
[58] Field of Search ............... 358/194.1, 192.1, 191.1; 455/151, 352, 353

[56] References Cited

U.S. PATENT DOCUMENTS

| | | | |
|---|---|---|---|
| 3,259,689 | 7/1966 | Sienkiewicz | 455/20 |
| 4,375,651 | 3/1983 | Templin et al. | 358/191.1 |
| 4,623,887 | 11/1986 | Welles, II | 358/194.1 |
| 4,709,412 | 11/1987 | Seymour et al. | 455/151 |
| 4,712,105 | 12/1987 | Kohler | 358/194.1 |
| 4,755,883 | 7/1988 | Uehira | 358/194.1 |
| 4,796,019 | 1/1989 | Auerbach | 340/709 |
| 4,825,200 | 4/1989 | Evans et al. | 455/353 |

FOREIGN PATENT DOCUMENTS 62-287777 12/1987 Japan .
63-111770 5/1988 Japan .
63-123276 5/1988 Japan .

*Primary Examiner*—Edward L. Coles, Sr.
*Assistant Examiner*—Thomas D. Lee

[57] ABSTRACT

A remote unit for use with a television receiver and which may be coupled to the television receiver either by an electric cord or by means of a wireless link. The remote unit is preferably equipped with its own speaker, and/or with earphones, for private listening without disturbing others and/or for the hearing impaired. The unit is also provided with a multiplicity of control buttons and indicators, for controlling the channel selection of the television receiver, and for controlling volume. In addition, the unit is provided with a screen which displays a clock, as well as volume and channel indications. Additional pushbutton switches are provided for selectively activating the speaker of the television receiver and/or the speaker of the remote unit.

3 Claims, 2 Drawing Sheets

REMOTE UNIT FOR CONTROLLING THE OPERATION OF A TELEVISION RECEIVER

BACKGROUND OF THE INVENTION

The invention is concerned with a remote unit which may be connected to a television receiver and which enhances the convenience and comfort of the user in operating the receiver, and which is especially suited to persons with impaired hearing.

The remote unit of the invention may be coupled to the television receiver either by an electric cord or by means of a wireless link.

The remote unit is preferably equipped with its own speaker, and/or with earphones, for the private listening of the user without disturbing others and/or for the hearing impaired.

The unit of the invention is also provided with a multiplicity of control button switches and indicators for controlling the channel selection of the television receiver. In addition, the unit is provided with a screen with displays a clock, as well as volume and channel indications.

DETAILED DESCRIPTION OF THE ILLUSTRATED EMBODIMENT

Figure 1:
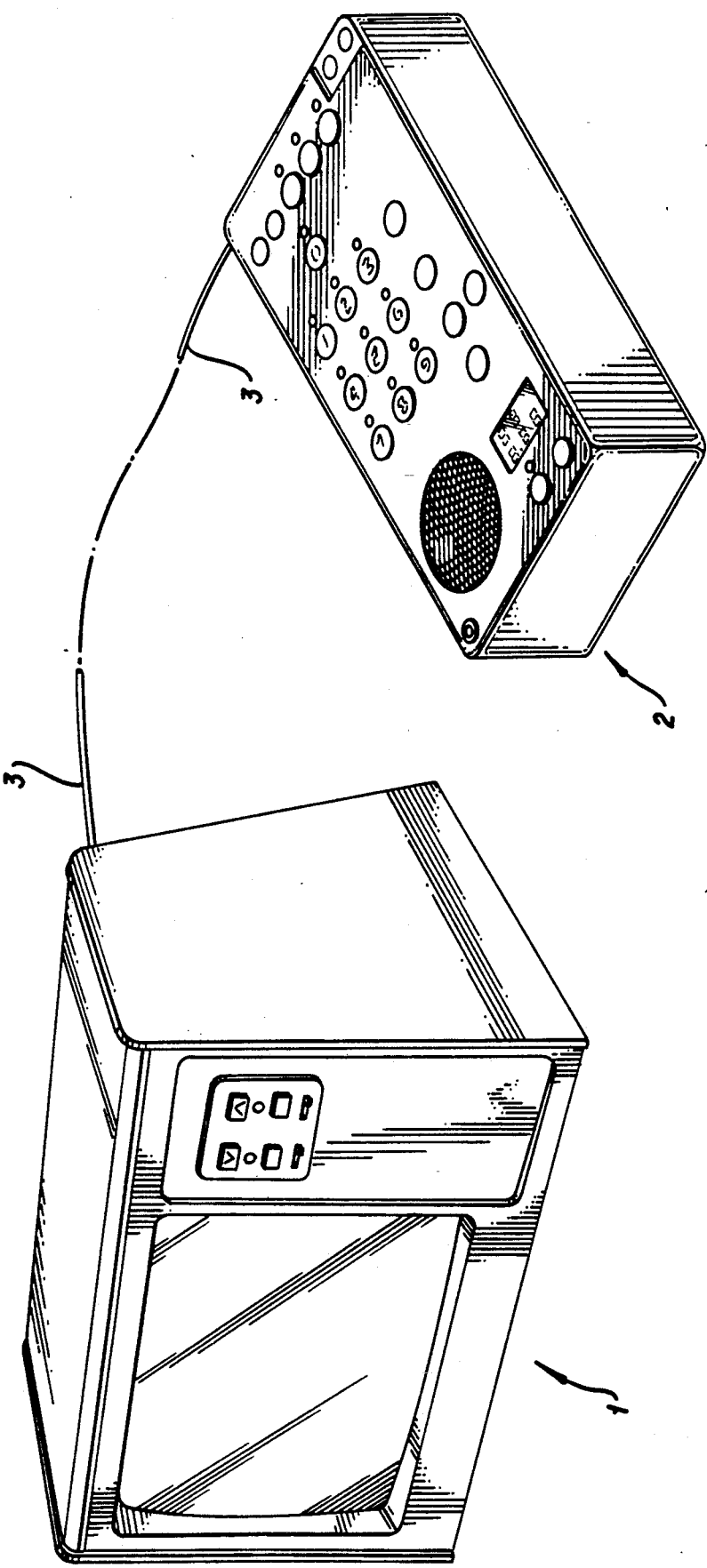
FIG. 1 is a representation of the remote unit of the invention in one of its embodiments, and of a television receiver which is controlled by the unit.

As shown in FIG. 1, the remote unit of the invention is designated 2, and it is connected to a television receiver 1 by means of an electric cord 3. As stated above, the electric cord 3 may be replaced by a wireless link. Internal circuitry is contained within the unit 12 to enable it to effect its various functions to be described. It should be pointed out that the electric circuitry employed within the unit may be of any well-known commercially available type, and, for that reason, will not be described in detail herein. Also, the provision of a wireless link between the remote unit and the television receiver is also well known, and need not be described in detail.

Figure 2:
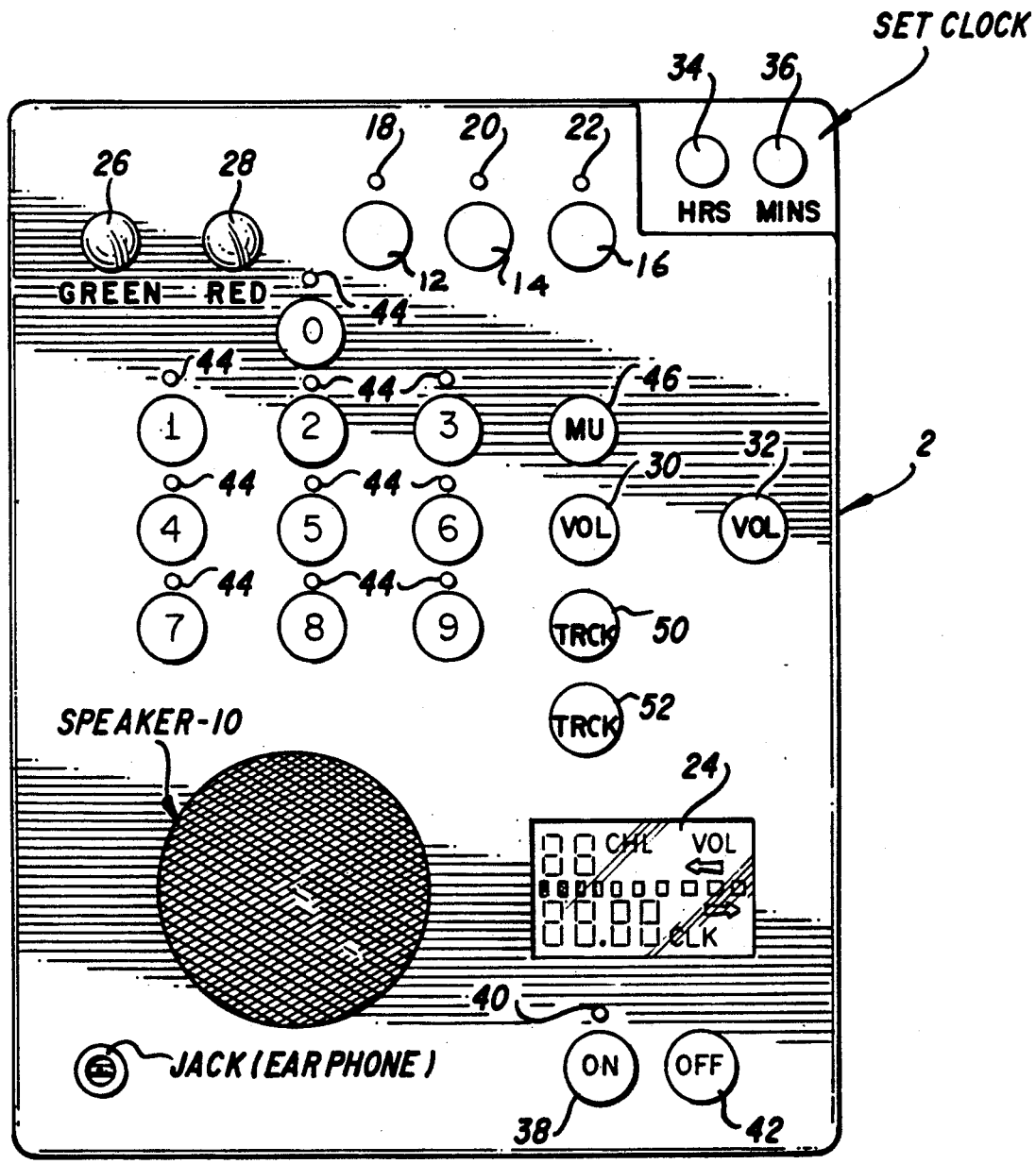
FIG. 2 is a top plan view of the control panel of the remote unit of FIG. 1.

The control panel of the remote unit is shown in FIG. 2. As shown in FIG. 2, the remote unit 2 includes a speaker 10 which is controlled by three pushbutton switches 12, 14 and 16. When pudhbutton switch 12 is actuated, for example, only the speaker of the television receiver 10 is turned on. Likewise, when switch 14 is activated only speaker 10 of the remote unit is turned on. When pushbutton switch 16 is actuated, both speakers are turned on. Audio signals from the television receiver may be transmitted to speaker 10 of the remote control unit 2 by any known means such as described, for example, in U.S. Pat. No. 4,375,651 which issued Mar. 1, 1983 to Templin et al and which is assigned to the Zenith Radio Corporation. Light emitting diodes (LED's) 18, 20 and 22 are positioned adjacent respective ones of the pushbuttons 12, 14 and 16 to indicate which of the pushbuttons has been actuated.

The remote unit also includes a screen 24 which displays, for example, a digital clock, a number representing the television receiver channel selected by the remote unit, as well as a series of numbers (for example, from 0-10) representing the volume level. The volume level is also represented by indicators 26 and 28, with indicator 26 being green, for example, to represent low volume, and with indicator 28 being red, for example, to represent high volume. Volume is controlled by pushbutton switches 30 and 32, with successive actuations of switch 30 increasing the volume, and with successive actuations of switch 32 decreasing the volume.

Additional pushbutton switches 34 and 36 are provided for setting the digital clock which appears on the screen 24.

The remote unit 2 is turned on by actuating a pushbutton switch 38. When the unit is turned on an LED 40 adjacent to the pushbutton switch 38 will be illuminated. The remote unit may be turned off by pushing a pushbutton switch 42.

Channel selection is effectuated by actuation of pushbutton switches 0-9. Whenever any particular one of the pushbutton switches is actuated, an adjacent LED 44 adjacent to the actuated pushbutton switch will become illuminated. For double digit channels, for example, two pushbutton switches are actuated, and the LED's 44 adjacent to the actuated pushbutton switches will become illuminated. Accordingly, a first indication of the selected channel is made by the illumination of the corresponding LED's 44. Also, screen 24 displays a number corresponding to the selected channel.

A mute pushbutton switch 46 may also be provided for muting the television receiver. A +TRCK pushbutton switch 50 and a −TRCK switch 52 are also provided for scanning the channel selection upwardly or downwardly from channel-to-channel.

The numbers and letters on the various pushbutton switches may be fluorescent. Also, the pushbutton switches may be self-illuminated, and activated by a light sensor to glow whenever the ambient light level falls below a predetermined threshold.

It will be appreciated that while a particular embodiment of the remote unit of the invention has been shown and described, modifications may be made. It is intended in the claims to cover all modifications which come within the spirit and scope of the invention.

I claim:

1. A remote unit for a television receiver, said television receiver including sound reproducing means, said remote unit comprising: a control panel, a plurality of television channel selection push-button switches mounted on said control panel; a screen mounted on the control panel for displaying numbers identifying the television channels selected by said channel selection push-button switches; second sound reproducing means mounted in said remote unit for reproducing the sound accompanying the television channels selected by said channel selection push-button switches; and further means mounted on said control panel for controlling the volume of the sound reproduced by said second sound reproducing means, and which includes volume indicator lights mounted on the control panel.

2. A remote unit for a television receiver, said television receiver including sound reproducing means, said remote unit comprising: a control panel, a plurality of television channel selection push-button switches mounted on said control panel; a screen mounted on the control panel for displaying numbers identifying the television channels selected by said channel selection push-button switches; second sound reproducing means mounted in said remote unit for reproducing the sound accompanying the television channels selected by said channel selection push-button switches; and further means mounted on said control panel for controlling the volume of the sound reproduced by said second sound reproducing means, and which includes a plurality of indicator lights mounted on the control panel adjacent to respective ones of said channel selection push-button switches to indicate which of the channel selection push-button switches have been activated.

3. A remote unit for a television receiver, said television receiver including sound reproducing means, said remote unit comprising: a control panel, a plurality of television channel selection push-button switches mounted on said control panel; a screen mounted on the control panel for displaying numbers identifying the television channels selected by said channel selection push-button switches; second sound reproducing means mounted in said remote unit for reproducing the sound accompanying the television channels selected by said channel selection push-button switches, and further means mounted on said control panel for controlling the volume of the sound reproduced by said second sound reproducing means, in which said screen also displays indications of the volume level of the sound reproduced by said first and second sound reproducing means.

* * * * *